(12) United States Patent
Hoshi et al.

(10) Patent No.: US 7,985,484 B2
(45) Date of Patent: Jul. 26, 2011

(54) HYDROGENATION PRODUCT OF BLOCK COPOLYMER OR SHEET OR FILM OF THE SAME

(75) Inventors: Susumu Hoshi, Tokyo (JP); Yukio Yamaura, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 944 days.

(21) Appl. No.: 11/887,941

(22) PCT Filed: Apr. 7, 2006

(86) PCT No.: PCT/JP2006/307490
§ 371 (c)(1),
(2), (4) Date: Oct. 5, 2007

(87) PCT Pub. No.: WO2006/109743
PCT Pub. Date: Oct. 19, 2006

(65) Prior Publication Data
US 2009/0061248 A1    Mar. 5, 2009

(30) Foreign Application Priority Data
Apr. 7, 2005    (JP) .............................. P.2005-110490

(51) Int. Cl.
B32B 27/30    (2006.01)
C08L 53/02    (2006.01)
C08F 236/06    (2006.01)

(52) U.S. Cl. ............ 428/521; 428/500; 525/88; 525/89; 525/93; 525/95

(58) Field of Classification Search .................. None
See application file for complete search history.

(56) References Cited

U.S. PATENT DOCUMENTS
2004/0176514 A1    9/2004    Kubo et al.
2005/0222331 A1    10/2005    Hoshi et al.

FOREIGN PATENT DOCUMENTS

| | | |
|---|---|---|
| EP | 1 403 317 A1 | 3/2004 |
| EP | 1 498 438 A1 | 1/2005 |
| JP | A-59-221348 | 12/1984 |
| JP | A-60-224520 | 11/1985 |
| JP | A-60-224522 | 11/1985 |
| JP | A-61-25819 | 2/1986 |
| JP | A-61-41544 | 2/1986 |
| JP | A-4-52129 | 2/1992 |
| JP | A-5-104630 | 4/1993 |
| JP | 05-245927 | 9/1993 |
| JP | 05-245928 | 9/1993 |
| JP | 06-184253 | 7/1994 |
| JP | A-6-220278 | 8/1994 |
| JP | A-7-216187 | 8/1995 |
| JP | A-2000-6329 | 1/2000 |
| JP | A-2000-185373 | 7/2000 |
| JP | A-2002-46231 | 2/2002 |
| JP | A-2002-201324 | 7/2002 |
| JP | 2003-321592 | 11/2003 |
| JP | 2005-60564 | 3/2005 |
| JP | 2005-126546 | 5/2005 |
| WO | WO 03/035705 A1 | 5/2003 |
| WO | WO 03/066697 | 8/2003 |
| WO | WO 03/091303 A1 | 11/2003 |
| WO | WO 03/091334 A1 | 11/2003 |

*Primary Examiner* — Monique R Jackson
(74) *Attorney, Agent, or Firm* — Finnegan, Henderson, Farbow, Garrett & Dunner, L.L.P.

(57) ABSTRACT

An object of the invention is to provide a block copolymer hydrogenation product suitable for a sheet and a heat shrinkable film which are excellent in solvent resistance, rigidity, elongation and transparency, which is excellent in a balance of physical properties such as solvent resistance, natural shrinkability, low-temperature shrinkability, rigidity, transparency and low-temperature elongation, and a composition thereof. The invention relates to a block copolymer hydrogenation product having a weight ratio of a vinyl aromatic hydrocarbon and a conjugated diene of 55/45 to 95/5, a number average molecular weight measured by gel permeation chromatography (GPC) of 30,000 to 500,000 and a hydrogenation rate of 30% or more, wherein the vinyl aromatic hydrocarbon incorporated into the hydrogenation product has a block rate of 60 to 98% by weight, wherein relative to the weight of the total vinyl aromatic hydrocarbon polymer blocks, the ratio of vinyl aromatic hydrocarbon polymer blocks having a molecular weight of 50,000 or less is 80% by weight or more and the ratio of vinyl aromatic hydrocarbon polymer blocks having a molecular weight of 15,000 or less is from 10 to 80% by weight, and wherein at least one peak temperature of function tan δ in a dynamic viscoelasticity measurement of the hydrogenation product is present within the range of exceeding −80° C. to lower than −10° C.

16 Claims, No Drawings

HYDROGENATION PRODUCT OF BLOCK COPOLYMER OR SHEET OR FILM OF THE SAME

TECHNICAL FIELD

The present invention relates to a block copolymer hydrogenation product suitable for a sheet and a heat shrinkable film which are excellent in solvent resistance, rigidity, elongation and transparency, which is excellent in a balance of physical properties such as solvent resistance, natural shrinkability, low-temperature shrinkability, rigidity, transparency and low-temperature elongation, and a composition thereof.

BACKGROUND ART

A block copolymer comprising a vinyl aromatic hydrocarbon and a conjugated diene, which has a relatively high vinyl aromatic hydrocarbon content, has been used for injection molding applications and extrusion molding applications for sheets, films and the like, utilizing characteristics such as transparency and impact resistance. In particular, a heat shrinkable film using the block copolymer comprising a vinyl aromatic hydrocarbon and a conjugated diene has no problems of a residual monomer, a residual plasticizer and generation of hydrogen chloride in burning of a vinyl chloride resin which has hitherto been used, so that it has been utilized for food packaging, cap seals, labels and the like. As characteristics necessary for a heat shrinkable film, there are requirements such as natural shrinkability, low-temperature shrinkability, transparency, mechanical strength and aptitude for packaging machinery. In order to improve these characteristics and obtain a good balance of physical properties, various studies have been made.

Patent document 1 specified below discloses a composition of a vinyl aromatic hydrocarbon-aliphatic unsaturated carboxylic acid-based derivative copolymer having an aliphatic unsaturated carboxylic acid-based derivative content of 5 to 80% by weight and a Vicat softening point not exceeding 90° C., and a copolymer comprising blocks of a vinyl aromatic hydrocarbon and a conjugated diene, in order to obtain a composition excellent in mechanical characteristics, optical characteristics, stretching characteristics, crack resistance characteristics and the like.

Patent document 2 specified below discloses a heat shrinkable film which has a specific glass transition point (Tg) in segments of a block copolymer comprising a vinyl aromatic hydrocarbon and a conjugated diene, in order to obtain a heat shrinkable film excellent in shrinkable characteristics and environmental destruction resistance.

Patent document 3 specified below discloses a heat shrinkable film which comprises a composition of a block copolymer comprising a vinyl aromatic hydrocarbon having a specific structure and a conjugated diene, in order to obtain a heat shrinkable film excellent in shrinkable characteristics and environmental destruction resistance.

Patent document 4 specified below discloses a low-temperature shrinkable film obtained by stretching a composition of a vinyl aromatic hydrocarbon-aliphatic unsaturated carboxylic acid-based derivative copolymer having a vinyl aromatic hydrocarbon content of 95 to 20% by weight and a Vicat softening point not exceeding 90° C. and a copolymer comprising blocks of a vinyl aromatic hydrocarbon and a conjugated diene, in order to obtain a shrinkable film excellent in low-temperature shrinkability, optical characteristics, crack resistance characteristics, dimensional stability and the like.

Patent document 5 specified below discloses a polystyrene-based heat shrinkable film comprising a composition of a block copolymer comprising a styrene-based hydrocarbon and a conjugated diene hydrocarbon and a styrene-based hydrocarbon-containing random copolymer having a specific Tg, in order to improve natural shrinkability at room temperature.

Patent document 6 specified below discloses a heat shrinkable hard film which comprises a composition of a vinyl aromatic hydrocarbon-aliphatic unsaturated carboxylic acid-based derivative copolymer having a Vicat softening point not exceeding 105° C. and a copolymer comprising blocks of a vinyl aromatic hydrocarbon and a conjugated diene, and has a specific heat shrinkage force, in order to obtain a transparent heat shrinkable film excellent in stability with time and impact resistance of the film.

Patent document 7 specified below discloses a composition of a copolymer comprising blocks of a vinyl aromatic hydrocarbon having a specific structure and molecular weight distribution and a conjugated diene and a vinyl aromatic hydrocarbon-(meth)acrylic ester copolymer resin, in order to obtain a composition balanced in transparency, rigidity and low-temperature surface impact properties.

Patent document 8 specified below discloses a transparent high-strength resin composition containing a block copolymer comprising a vinyl aromatic hydrocarbon block having a specific structure and a copolymer block of a vinyl aromatic hydrocarbon and a conjugated diene, and a copolymer of a vinyl aromatic hydrocarbon and a (meth)acrylic ester, in order to obtain a resin composition excellent in transparency and impact resistance.

Patent document 9 specified below discloses a multilayer low-temperature shrinkable film having at least one layer of a composition of a vinyl aromatic hydrocarbon-aliphatic unsaturated carboxylic acid-based derivative copolymer having a vinyl aromatic hydrocarbon content of 95 to 20% by weight and a Vicat softening point not exceeding 90° C. and a copolymer comprising blocks of a vinyl aromatic hydrocarbon and a conjugated diene, in order to obtain a shrinkable film excellent in low-temperature shrinkability, optical characteristics, crack resistance characteristics, dimensional stability and the like.

Patent document 10 specified below discloses a multilayer polystyrene-based heat shrinkable film which has at least three layers having both outer layers comprising a mixture of a styrene-butadiene-styrene type block copolymer having a specific butadiene unit content and styrene-butyl acrylate and an intermediate layer comprising a mixture of a styrene-butadiene-styrene type block copolymer having a specific butadiene unit content and styrene-butyl acrylate, in order to obtain a shrinkable film excellent in natural shrinkability, strength, surface characteristics, resiliency, low-temperature shrinkability and the like.

Patent document 11 specified below discloses a heat shrinkable polystyrene-based laminated film comprising as an intermediate layer a compound in which a block copolymer comprising a vinyl aromatic hydrocarbon and a conjugated diene-based hydrocarbon is combined with a copolymer of a vinyl aromatic hydrocarbon and an aliphatic unsaturated carboxylic ester, and as front and back layers a mixed copolymer mainly composed of a block copolymer comprising a vinyl aromatic hydrocarbon and a conjugated diene-based hydrocarbon, in order to obtain a heat shrinkable film excellent in any characteristic of natural shrinkability, resistance to heat fusion bonding, transparency and shrinkage finishing properties.

Patent document 12 specified below discloses a multilayer heat shrinkable polystyrene-based film having a specific degree of heat shrinkage, in which an intermediate layer is mainly composed of a styrene-(meth)acrylic ester copolymer having a specific Vicat softening point, and inner and outer layers are mainly composed of a styrene-conjugated diene block copolymer having a specific Vicat softening point, in order to obtain a heat shrinkable film excellent in heat shrinkability at low temperatures, shrinkage finishing properties and the degree of natural shrinkage, and undergoing no blocking with each other in a heated state.

Patent document 13 specified below discloses a (multilayer) heat shrinkable film having a layer mainly composed of a copolymer resin comprising a styrene-based monomer and a (meth)acrylic ester-based monomer, which is characterized by a specific molecular weight distribution and residual monomer amount, a block copolymer resin comprising styrene and a conjugated diene, and a high-impact polystyrene resin composition, in order to obtain a resin composition, a film and a multilayer film which are excellent in processing characteristics and storage stability, reduced in odor, and excellent in rigidity and impact resistance.

Patent document 14 specified below discloses a hydrogenated copolymer characterized by a specific weight ratio of a conjugated diene monomer and a vinyl aromatic hydrocarbon monomer, an amount of polymer blocks of a vinyl aromatic hydrocarbon monomer, and absence of crystallization in a DSC chart within a specific temperature range, in order to obtain a hydrogenated copolymer rich in flexibility, excellent in impact resilience and scratch resistance, and good in handling properties (blocking resistance).

Patent document 15 specified below discloses a hydrogenated copolymer having a specific structure, in order to obtain a composition good in puncture impact value, strength, transparency and the like.

However, these block copolymers comprising a vinyl aromatic hydrocarbon and a conjugated diene, or the compositions comprising the block copolymer and a vinyl aromatic hydrocarbon-aliphatic unsaturated carboxylic acid-based derivative copolymer, or the hydrogenated copolymers comprising a vinyl aromatic hydrocarbon and a conjugated diene and the compositions thereof are insufficient in a balance of physical properties such as solvent resistance, natural shrinkability, low-temperature shrinkability, rigidity, transparency and impact resistance suitable for a sheet and a heat shrinkable film which are excellent in impact resistance, solvent resistance, rigidity and transparency. These documents do not disclose any methods for improving them, and the problems in the market have still been pointed out.

Patent Document 1: JP-A-59-221348
Patent Document 2: JP-A-60-224520
Patent Document 3: JP-A-60-224522
Patent Document 4: JP-A-61-25819
Patent Document 5: JP-A-4-52129
Patent Document 6: JP-A-5-104630
Patent Document 7: JP-A-6-220278
Patent Document 8: JP-A-7-216187
Patent Document 9: JP-A-61-41544
Patent Document 10: JP-A-2000-185373
Patent Document 11: JP-A-2000-6329
Patent Document 12: JP-A-2002-46231
Patent Document 13: JP-A-2002-201324
Patent Document 14: WO 03/035705
Patent Document 15: WO 03/066697

DISCLOSURE OF THE INVENTION

Problems to be Solved by the Invention

An object of the invention is to provide a block copolymer hydrogenation product suitable for a sheet and a heat shrinkable film which are excellent in solvent resistance, rigidity, elongation and transparency, which is excellent in a balance of physical properties such as solvent resistance, natural shrinkability, low-temperature shrinkability, rigidity, transparency and low-temperature elongation, and a composition thereof.

Means for Solving the Problems

As a result of intensive studies, the present inventors have found that the above-mentioned objects are achieved by a specific block copolymer hydrogenation product, thus arriving at the invention.

That is to say, the invention is as follows:

[1] A block copolymer hydrogenation product having a weight ratio of a vinyl aromatic hydrocarbon and a conjugated diene of 55/45 to 95/5, a number average molecular weight measured by gel permeation chromatography (GPC) of 30,000 to 500,000 and a hydrogenation rate of 30% or more, wherein the vinyl aromatic hydrocarbon incorporated into the hydrogenation product has a block rate of 60 to 98% by weight, wherein relative to the weight of the total vinyl aromatic hydrocarbon polymer blocks, the ratio of vinyl aromatic hydrocarbon polymer blocks having a molecular weight of 50,000 or less is 80% by weight or more and the ratio of vinyl aromatic hydrocarbon polymer blocks having a molecular weight of 15,000 or less is from 10 to 80% by weight, and wherein at least one peak temperature of function tan δ in a dynamic viscoelasticity measurement of the hydrogenation product is present within the range of exceeding −80° C. to lower than −10° C.

[2] The block copolymer hydrogenation product described in the above [1], wherein the weight ratio of the vinyl aromatic hydrocarbon and the conjugated diene is 60/40 to 95/5, the hydrogenation rate is 45% or more, the block rate of the vinyl aromatic hydrocarbon incorporated into the hydrogenation product is from 75 to 98% by weight, and relative to the weight of the total vinyl aromatic hydrocarbon polymer blocks, the ratio of vinyl aromatic hydrocarbon polymer blocks having a molecular weight of 50,000 or less is 85% by weight or more and the ratio of vinyl aromatic hydrocarbon polymer blocks having a molecular weight of 15,000 or less is from 10 to 60% by weight.

[3] The block copolymer hydrogenation product described in the above [1] or [2], wherein the ratio of vinyl aromatic hydrocarbon polymer blocks having a molecular weight of 15,000 or less relative to the weight of the total vinyl aromatic hydrocarbon polymer blocks is from 10 to 50% by weight.

[4] The block copolymer hydrogenation product described in any one of the above [1] to [3], wherein the block copolymer hydrogenation product has a hydrogenation rate of 60% or more.

[5] The block copolymer hydrogenation product described in any one of the above [1] to [4], wherein at least one peak temperature of function tan δ in a dynamic viscoelasticity measurement of the block copolymer hydrogenation product is present within the range of exceeding −70° C. to −15° C.

[6] The block copolymer hydrogenation product described in any one of the above [1] to [5], wherein the block rate of the vinyl aromatic hydrocarbon incorporated into the hydrogenation product is from exceeding 80% by weight to 95% by weight.

[7] The block copolymer hydrogenation product described in any one of the above [1] to [6], wherein the weight ratio of the vinyl aromatic hydrocarbon and the conjugated diene is 65/35 to 90/10, and at least one vinyl aromatic hydrocarbon polymer block having a peak molecular weight within the molecular weight range of 5,000 to 30,000 is incorporated.

[8] The block copolymer hydrogenation product described in any one of the above [1] to [7], wherein the content of short-chain vinyl aromatic hydrocarbon polymer moieties having a vinyl aromatic hydrocarbon unit number ranging from 1 to 3 is from 1 to 25% by weight based on the total amount of the vinyl aromatic hydrocarbons constituting the block copolymer hydrogenation product.

[9] The block copolymer hydrogenation product described in any one of the above [1] to [8], wherein at least one polymer block selected from the group consisting of (i) a copolymer block comprising isoprene and 1,3-butadiene, (ii) a copolymer block comprising isoprene and a vinyl aromatic hydrocarbon and (iii) a copolymer block comprising isoprene, 1,3-butadiene and a vinyl aromatic hydrocarbon is incorporated into the block copolymer hydrogenation product, and the weight ratio of butadiene and isoprene in said block copolymer hydrogenation product is 3/97 to 90/10.

[10] The block copolymer hydrogenation product described in any one of the above [1] to [9], wherein the block copolymer hydrogenation product has a crystallization peak in a temperature region of 0° C. to 60° C., in a differential scanning calorimetry (DSC) chart.

[11] A composition comprising (A) the block copolymer hydrogenation product described in any one of the above [1] to [10] and (B) a vinyl aromatic hydrocarbon-based polymer, wherein the weight ratio of component (A) and component (B) is from 99.9/0.1 to 20/80.

[12] The composition described in the above [11], wherein the vinyl aromatic hydrocarbon-based polymer (B) is at least one member selected from the group consisting of the following a) to c):

a) a styrene-based polymer, b) a copolymer of a vinyl aromatic hydrocarbon and at least one aliphatic unsaturated carboxylic acid selected from the group consisting of an aliphatic unsaturated carboxylic acid, an aliphatic unsaturated carboxylic anhydride and an aliphatic unsaturated carboxylic ester, or a derivative thereof, and c) a rubber-modified styrene-based polymer.

[13] The composition described in the above [11] or [12], which contains at least one lubricant selected from the group consisting of a fatty acid amide, a paraffin, a hydrocarbon-based resin and a fatty acid in an amount of 0.01 to 5 parts by weight based on 100 parts by weight of the block copolymer hydrogenation product (A).

[14] The composition described in any one of the above [11] to [13], which contains at least one stabilizer selected from the group consisting of 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate and 2,4-bis[(octylthio)methyl]-o-cresol in an amount of 0.05 to 3 parts by weight based on 100 parts by weight of the block copolymer hydrogenation product (A).

[15] The composition described in any one of the above [11] to [14], which contains at least one ultraviolet absorber or light stabilizer selected from the group consisting of a benzophenone-based ultraviolet absorber, a benzotriazole-based ultraviolet absorber and a hindered amine-based light stabilizer in an amount of 0.05 to 3 parts by weight based on 100 parts by weight of the block copolymer hydrogenation product (A).

[16] A sheet/film comprising the composition described in any one of the above [11] to [15].

[17] A heat shrinkable sheet/film obtained by stretching the sheet/film described in the above [16], wherein the degree of heat shrinkage at 80° C. in the stretching direction is from 5 to 70%, and the tensile modulus in the stretching direction is from 7,000 to 30,000 Kg/cm$^2$.

[18] A heat shrinkable multilayer film having as at least one layer a layer comprising the composition described in [11] or [12], wherein the degree of heat shrinkage at 80° C. in a stretching direction is from 5 to 70%.

[19] The heat shrinkable multilayer film described in the above [18], which has a tensile modulus in a stretching direction of 7,000 to 30,000 Kg/cm$^2$.

Advantages of the Invention

The sheet using the block copolymer hydrogenation product of the invention is excellent in solvent resistance, rigidity, elongation and transparency, and the heat shrinkable film is excellent in a balance of physical properties such as solvent resistance, natural shrinkability, low-temperature shrinkability, rigidity, transparency and low-temperature elongation.

BEST MODE FOR CARRYING OUT THE INVENTION

The invention will be described in detail below.

The block copolymer hydrogenation product of the invention has a weight ratio of a vinyl aromatic hydrocarbon and a conjugated diene of 55/45 to 95/5, preferably 60/40 to 95/5, more preferably 65/35 to 90/10. When the weight ratio of a vinyl aromatic hydrocarbon and a conjugated diene is within the range of 55/45 to 95/5, a sheet and a heat shrinkable film which are improved in rigidity and low-temperature elongation can be obtained.

The vinyl aromatic hydrocarbon content of the block copolymer hydrogenation product may also be grasped by the vinyl aromatic compound content of a block copolymer before hydrogenation.

The vinyl aromatic hydrocarbon incorporated into the block copolymer hydrogenation product has a block rate of 60 to 98% by weight, preferably 75 to 98%, more preferably exceeding 80% by weight to 95% by weight. When the block rate is within the range of 60 to 98% by weight, a balance of rigidity and low-temperature elongation is excellent.

The block ratio of the vinyl aromatic hydrocarbon incorporated into the block copolymer hydrogenation product can be measured by a method of subjecting the block copolymer before hydrogenation to oxidative degradation with t-butyl hydroperoxide using osmium tetraoxide as a catalyst (a method described in I. M. Kolthoff et al., *J. Polym. Sci.*, 1, 429 (1946)), and means a value obtained form the following equation, using vinyl aromatic hydrocarbon polymer block components (provided that vinyl aromatic hydrocarbon polymer block components having an average degree of polymerization of about 30 or less are excepted) obtained by this method.

Block rate (% by weight)=(the weight of vinyl aromatic hydrocarbon polymer blocks in a block copolymer/the weight of the total aromatic hydrocarbons in the block copolymer)×100

In the block copolymer hydrogenation product of the invention, at least one vinyl aromatic hydrocarbon polymer block having a peak molecular weight within the molecular weight range of preferably 5,000 to 30,000, more preferably 8,000 to 25,000, particularly preferably 10,000 to 20,000 is incorporated.

In the block copolymer hydrogenation product of the invention, at least one vinyl aromatic hydrocarbon polymer block having a peak molecular weight within the molecular weight range of 5,000 to 30,000 is incorporated, thereby being able to obtain a heat shrinkable film excellent in solvent resistance, natural shrinkability, low-temperature shrinkability and hot-water fusion bonding resistance.

In the vinyl aromatic hydrocarbon polymer blocks incorporated into the block copolymer hydrogenation product of the invention, the ratio of vinyl aromatic hydrocarbon polymer blocks having a molecular weight of 50,000 or less is 80% by weight or more of the total vinyl aromatic hydrocarbon polymer blocks, and the ratio of vinyl aromatic hydrocarbon polymer blocks having a molecular weight of 15,000 or less is from 10 to 80% by weight of the total vinyl aromatic hydrocarbon polymer blocks, preferably, the ratio of vinyl aromatic hydrocarbon polymer blocks having a molecular weight of 50,000 or less is 85% by weight or more of the total vinyl aromatic hydrocarbon polymer blocks, and the ratio of vinyl aromatic hydrocarbon polymer blocks having a molecular weight of 15,000 or less is from 10 to 60% by weight of the total vinyl aromatic hydrocarbon polymer blocks, more preferably, the ratio of vinyl aromatic hydrocarbon polymer blocks having a molecular weight of 50,000 or less is 90% by weight or more of the total vinyl aromatic hydrocarbon polymer blocks, and the ratio of vinyl aromatic hydrocarbon polymer blocks having a molecular weight of 15,000 or less is from 10 to 55% by weight of the total vinyl aromatic hydrocarbon polymer blocks, and particularly preferably, the ratio of vinyl aromatic hydrocarbon polymer blocks having a molecular weight of 50,000 or less is 95% by weight or more of the total vinyl aromatic hydrocarbon polymer blocks, and the ratio of vinyl aromatic hydrocarbon polymer blocks having a molecular weight of 15,000 or less is from 10 to 50% by weight of the total vinyl aromatic hydrocarbon polymer blocks. When the ratio of vinyl aromatic hydrocarbon polymer blocks having a molecular weight of 50,000 or less is 80% by weight or more of the total vinyl aromatic hydrocarbon polymer blocks, and the ratio of vinyl aromatic hydrocarbon polymer blocks having a molecular weight of 15,000 or less is from 10 to 80% by weight of the total vinyl aromatic hydrocarbon polymer blocks, a heat shrinkable film excellent in natural shrinkability and low-temperature shrinkability can be obtained.

In the block copolymer hydrogenation product of the invention, a peak temperature of function tan $\delta$ in a dynamic viscoelasticity measurement is necessary to be present within the range of exceeding −80° C. to lower than −10° C., preferably within the range of exceeding −70° C. to −15° C., and more preferably within the range of exceeding −65° C. to lower than −16° C. When the peak temperature of function tan $\delta$ in the dynamic viscoelasticity measurement is present within the range of exceeding −80° C. to lower than −10° C., elongation at low temperature (−10° C.) is excellent. When the peak temperature of function tan $\delta$ in the dynamic viscoelasticity measurement is present within the temperature range of −10° C. to 80° C., it is unfavorable because of poor low-temperature elongation. However, the peak temperature may be within the temperature region exceeding 80° C. The function tan $\delta$ in the dynamic viscoelasticity measurement is a value measured, for example, with a viscoelasticity measuring analyzer, DVE-V4, manufactured by Rheology Co., Ltd., Rheovibron DDV-3 manufactured by Toyo Baldwin Co., Ltd., or the like, and is measured using a test piece having a thickness of 0.5 to 2 mm under conditions of an oscillation frequency of 35 Hz and a temperature elevation rate of 3° C./min.

The temperature showing the peak means a temperature at which the primary differentiated value of the variation of the value of tan $\delta$ relative to the temperature becomes zero. This peak temperature of tan $\delta$ is adjusted by the weight ratio of the vinyl aromatic hydrocarbon and the conjugated diene, the molecular weight of the block copolymer hydrogenation product, the content of the vinyl aromatic hydrocarbon polymer blocks in the block copolymer hydrogenation product, the content of short-chain vinyl aromatic hydrocarbon polymer moieties having a vinyl aromatic hydrocarbon unit number ranging from 1 to 3 in the block copolymer hydrogenation product, a microstructure of the conjugated diene and the like. More particularly, it is necessary to adjust the vinyl aromatic hydrocarbon content to 50% by weight or less in at least one copolymer moiety comprising the vinyl aromatic hydrocarbon and the conjugated diene, and to adjust the amount of a polar solvent added to an optimum amount, in order to decrease chains of the conjugated diene of the copolymer moiety comprising the vinyl aromatic hydrocarbon and the conjugated diene, to the utmost.

The block copolymer hydrogenation product of the invention has a number average molecular weight (molecular weight converted to polystyrene) measured by gel permeation chromatography (GPC) ranging from 30,000 to 500,000, preferably from 50,000 to 500,000, more preferably from 70,000 to 300,000, and a mixture of a plurality of block copolymers different in molecular weight may be used. It is recommended that the preferred melt flow rate (measured according to JIS-K-6870, conditions: conditions G, temperature: 200° C., load: 5 kg) of the block copolymer is from 0.1 to 100 g/10 min, preferably from 0.5 to 50 g/10 min, and more preferably from 1 to 30 g/10 min, in terms of molding processability. The molecular weight and the melt flow rate (hereinafter occasionally abbreviated as MFR) can be arbitrarily adjusted by the amount of a catalyst used in polymerization.

It is recommended that the content of short-chain vinyl aromatic hydrocarbon polymer moieties having a vinyl aromatic hydrocarbon unit number ranging from 1 to 3 is from 1 to 25% by weight, preferably from 3 to 23% by weight, and more preferably from 5 to 20% by weight, based on the total amount of the vinyl aromatic hydrocarbons constituting the block copolymer hydrogenation product. When the content of the short-chain vinyl hydrocarbon polymer moieties is within the range of 1 to 25% by weight, rigidity is high and natural shrinkability is good. The content of the short-chain vinyl aromatic hydrocarbon polymer moieties can be determined by conducting gel permeation chromatography (GPC) of the vinyl aromatic hydrocarbon components obtained by dissolving the block copolymer before hydrogenation in dichloromethane, subjecting it to oxidative degradation with ozone ($O_3$), and then, reducing the resulting ozonide with lithium aluminum hydride in diethyl ether, followed by hydrolysis with pure water, and calculating the area ratio of peaks obtained (see Takayuki Tanaka, Toshiya Sato and Yasunobu Nakafutami, Kobunshi Gakkai Yokoshu (*Preprints of Meeting of the Society of Polymer Science*), 29, 2051 (1980)).

The content of the short-chain vinyl aromatic hydrocarbon polymer moieties can be controlled by changing the weight, the weight ratio, the polymerization reactivity ratio and the like of the vinyl aromatic hydrocarbon and the conjugated diene in the course of copolymerization of the vinyl aromatic hydrocarbon and the conjugated diene in the production of the block copolymer. As specific methods, there can be employed methods of continuously supplying a mixture of the vinyl aromatic hydrocarbon and the conjugated diene to a polymerization system to polymerize them, and/or copolymerizing the vinyl aromatic hydrocarbon and the conjugated diene using a polar compound or a randomizing agent, and the like. The polar compounds and randomizing agents include ethers such as tetrahydrofuran, diethylene glycol dimethyl ether and diethylene glycol dibutyl ether, amines such as triethylamine and tetramethylethylenediamine, thioethers, phosphines, phosphoramides, alkylbenzenesulfonates, alkoxides of potassium or sodium, and the like. The microstructure of conjugated diene monomer units in the block copolymer, which is described later, can be adjusted by adding the polar compound or the like in a specified amount.

The block copolymer hydrogenation product of the invention has at least one segment constituted by a vinyl aromatic hydrocarbon homopolymer and/or the copolymer comprising the vinyl aromatic hydrocarbon and the conjugated diene, and at least one segment constituted by a conjugated diene homopolymer and/or the copolymer comprising the vinyl aromatic hydrocarbon and the conjugated diene. Although there is no particular limitation on the polymer structure before hydrogenation of the block copolymer hydrogenation product, there can be used, for example, linear block copolymer hydrogenation products or radial block copolymer hydrogenation products represented by the following general formulas, or an arbitrary mixture of these polymer structures. Further, in the radial block copolymer hydrogenation products represented by the above-mentioned general formulas, at least one of A and/or B may be further bonded to X.

$(A-B)_n$, $A-(B-A)_n$, $B-(A-B)_{n+1}$, $[(A-B)_k]_{m+1}$—X, $[(A-B)_k-A]_{m+1}$—X, $[(B-A)_k]_{m+1}$—X and $[(B-A)_k-B]_{m+1}$—X (In the above formulas, segment A is the vinyl aromatic hydrocarbon homopolymer and/or the copolymer comprising the vinyl aromatic hydrocarbon and the conjugated diene, and segment B is the conjugated diene homopolymer and/or the copolymer comprising the vinyl aromatic hydrocarbon and the conjugated diene. X indicates, for example, a residue of a coupling agent such as silicon tetrachloride, tin tetrachloride, 1,3-bis(N,N-glycidylaminomethyl)cyclohexane or epoxidized soybean oil, or a residue of an initiator such as a multifunctional organic lithium compound. n, k and m are an integer of 1 or more, and generally an integer of 1 to 5. Further, the structures of a plurality of polymer chains bonded to X may be the same or different.)

In the invention, the vinyl aromatic hydrocarbon in the copolymer of the vinyl aromatic hydrocarbon and the conjugated diene in segment A and segment B may be distributed either uniformly or in a tapered (gradually decreasing) form. Further, in the copolymer hydrogenation product, moieties in which the vinyl aromatic hydrocarbon is uniformly distributed and/or moieties in which it is distributed in a tapered form may each plurally coexist in the segment. As for the relationship between the vinyl aromatic hydrocarbon content in segment A ({the vinyl aromatic hydrocarbon in segment A/(the vinyl aromatic hydrocarbon+the conjugated diene in segment A)}×100) and the vinyl aromatic hydrocarbon content in segment B ({the vinyl aromatic hydrocarbon in segment B/(the vinyl aromatic hydrocarbon+the conjugated diene in segment B)}×100), the vinyl aromatic hydrocarbon content in segment A is larger than the vinyl aromatic hydrocarbon content in segment B. The preferred difference in the vinyl aromatic hydrocarbon content between segment A and segment B is preferably 5% by weight or more.

In the invention, the block copolymer before hydrogenation can be obtained by polymerizing the vinyl aromatic hydrocarbon and the conjugated diene in a hydrocarbon solvent, using an organic lithium compound as an initiator. The vinyl aromatic hydrocarbons used in the invention include styrene, o-methylstyrene, p-methylstyrene, p-tert-butylstyrene, 1,3-dimethylstyrene, α-methylstyrene, vinylnaphthalene, vinylanthracene, 1,1-diphenylethylene, N,N-dimethyl-p-aminoethylstyrene, N,N-diethyl-p-aminoethylstyrene and the like. Among them, styrene is most commonly used. These may be used not only alone, but also as a mixture of two or more thereof.

The conjugated diene is a diolefin having a pair of conjugated double bonds, and examples thereof include 1,3-butadiene, 2-methyl-1,3-butadiene (isoprene), 2,3-dimethyl-1,3-butadiene, 1,3-pentadiene, 1,3-hexadiene and the like. Among them, 1,3-butadiene, isoprene and the like are most commonly used. These may be used not only alone, but also as a mixture of two or more thereof.

In the block copolymer hydrogenation product of the invention, at least one polymer block selected from the group consisting of (i) a copolymer block comprising isoprene and 1,3-butadiene, (ii) a copolymer block comprising isoprene and a vinyl aromatic hydrocarbon and (iii) a copolymer block comprising isoprene, 1,3-butadiene and a vinyl aromatic hydrocarbon may be incorporated. The weight ratio of butadiene and isoprene is from 3/97 to 90/10, preferably from 5/95 to 85/15, and more preferably from 10/90 to 80/20. When the hydrogenation rate of the block copolymer hydrogenation product of the invention is from 30 to 70%, gel formation in heat forming-processing and the like is decreased.

In the invention, the block copolymer before hydrogenation is obtained, for example, by anionic living. polymerization in a hydrocarbon solvent using an organic alkali metal compound or the like as an initiator. As the hydrocarbon solvents, there can be used, for example, aliphatic hydrocarbons such as n-butane, isobutane, n-pentane, n-hexane, n-heptane and n-octane, alicyclic hydrocarbons such as cyclopentane, methylcyclopentane, cyclohexane, methylcyclohexane, cycloheptane and methylcycloheptane, and aromatic hydrocarbons such as benzene, toluene, xylene and ethylbenzene. These may be used not only alone, but also as a mixture of two or more thereof.

Further, as the polymerization initiator, there can be used an aliphatic hydrocarbon alkali metal compound, an aromatic hydrocarbon alkali metal compound, an organic aminoalkali metal compound or the like, which is generally known to have anionic polymerization activity to the conjugated diene and the vinyl aromatic compound. The alkali metals include lithium, sodium, potassium and the like, and preferred examples of the organic alkali metal compounds include aliphatic and aromatic hydrocarbon lithium compounds having 1 to 20 carbon atoms, a compound containing one lithium atom in one molecule and a dilithium, trilithium and tetralithium compounds containing a plurality of lithium atoms in one molecule.

Specifically, they include n-propyllithium, n-butyllithium, sec-butyllithium, tert-butyllithium, hexamethylenedilithium, butadienyldilithium, isoprenyldilithium, a reaction product of diisopropenylbenzene and sec-butyllithium, further a reaction product of divinylbenzene, sec-butyllithium and a small amount of 1,3-butadiene, and the like. Further, organic alkali metal compounds disclosed in U.S. Pat. No. 5,708,092, British Patent 2,241,239, U.S. Pat. No. 5,527,753 and the like can also be used. These may be used not only alone, but also as a mixture of two or more thereof.

In the invention, the polymerization temperature in producing the block copolymer before hydrogenation is generally from −10° C. to 150° C., and preferably from 40° C. to 120° C. The time required for polymerization is usually 10 hours or less, and particularly suitably from 0.5 to 5 hours, although it varies depending on the conditions. Further, it is desirable to replace the atmosphere of the polymerization system with an inert gas such as nitrogen gas, or the like. The polymerization pressure is not particularly limited, as long as it is within the range enough to keep the monomers and solvent in a liquid layer in the above-mentioned polymerization temperature range. Furthermore, it is necessary to pay attention so as not to allow impurities which inactivate the catalyst and living polymer, for example, water, oxygen, carbon dioxide and the like, to be mixed into the polymerization system.

The block copolymer hydrogenation product of the invention is obtained by hydrogenating the block copolymer before hydrogenation obtained above. A hydrogenation catalyst is not particularly limited, and there is used (1) a supported type heterogeneous hydrogenation catalyst in which a metal such as Ni, Pt, Pd or Ru is supported on a carbon, silica, alumina, diatomaceous earth or the like, (2) a so-called Ziegler type hydrogenation catalyst using an organic acid salt of Ni, Co, Fe, Cr or the like or a transition metal salt such as an acetylacetone salt and a reducing agent such as an organoaluminum, or (3) a homogeneous hydrogenation catalyst of a so-called organic metal complex such as an organic metal compound of Ti, Ru, Rh, Zr or the like, which has hitherto been known. As the specific hydrogenation catalysts, there can be used hydrogenation catalysts described in JP-B-42-8704, JP-B-43-6636, JP-B-63-4841, JP-B-1-37970, JP-B-1-53851 and JP-B-2-9041. Preferred examples of the hydrogenation catalysts include a titanocene compound and/or a mixture with a reducing organic metal compound.

As the titanocene compounds, there can be used compounds described in JP-A-8-109219. Specific examples thereof include a compound having at least one ligand having a (substituted) cyclopentadienyl skeleton, an indenyl skeleton or a fluorenyl skeleton, such as biscyclopentadienyltitanium dichloride or monopentamethylcyclopentadienyltitanium trichloride. Further, the reducing organic metal compounds include an organic alkali metal compound such as an organolithium, an organomagnesium compound, an organoaluminum compound, an organoboron compound, an organozinc compound or the like.

The hydrogenation reaction is generally conducted within the temperature range of 0 to 200° C., more preferably 30 to 150° C. The pressure of hydrogen used in the hydrogenation reaction is recommended to be from 0.1 to 15 MPa, preferably from 0.2 to 10 MPa, and more preferably from 0.3 to 7 MPa. Further, the hydrogenation reaction time is usually from 3 minutes to 10 hours, and preferably from 10 minutes to 5 hours. In the hydrogenation reaction, any one of a batch process, a continuous process and a combination thereof can be used.

As for the hydrogenation rate of unsaturated double bonds based on the conjugated diene in the block copolymer hydrogenation product of the invention, it is necessary that 30% or more, preferably 45% or more, more preferably 60% or more and particularly preferably 70% or more of the unsaturated double bonds based on the conjugated diene compound in the polymer are hydrogenated. When the hydrogenation rate is 30% or more, solvent resistance and low-temperature elongation are excellent. Although there is no particular limitation on the hydrogenation rate of aromatic double bonds based on the vinyl aromatic hydrocarbon in the copolymer, it is preferred that the hydrogenation rate is adjusted to 50% or less, preferably to 30% or less, and more preferably to 20% or less. The hydrogenation rate can be known by means of a nuclear magnetic resonance apparatus (NMR).

In the invention, the microstructure (the ratio of cis, trans and vinyl) of the conjugated diene moiety in the block copolymer hydrogenation product can be arbitrarily changed by the use of the above-mentioned polar compound or the like, and there is no particular limitation thereon. In general, the amount of vinyl bonds can be set within the range of 5 to 90%, preferably 10 to 80%, more preferably 15 to 75%. In the invention, the amount of vinyl bonds is the total amount of 1,2-vinyl bonds and 3,4-vinyl bonds (provided that it is the amount of 1,2-vinyl bonds, when 1,3-butadiene is used as the conjugated diene). The amount of vinyl bonds can be grasped with a nuclear magnetic resonance apparatus (NMR).

In the invention, when the block copolymer hydrogenation product particularly excellent in rigidity is obtained, preferred is a block copolymer hydrogenation product having a crystallization peak within the temperature range of 0° C. to 60° C., preferably 5° C. to 60° C., more preferably 10° C. to 60° C., in a differential scanning calorimetry (DSC) chart of the block copolymer hydrogenation product. It is preferred that the heat quantity of this crystallization peak is 3 J/g or more, preferably 6 J/g or more, and more preferably 10 J/g or more. The block copolymer hydrogenation product having the crystallization peak can be obtained by setting the amount of vinyl bonds in the block copolymer before hydrogenation to less than 30%, preferably to 8 to 25%, more preferably to 10 to 25%, and particularly preferably to 12 to 20%. In particular, it is recommended that the block copolymer before hydrogenation is allowed to contain at least one conjugated diene polymer segment having a vinyl bond amount of 8 to 25%, preferably 10 to 20%, and more preferably 10 to 18%.

The block copolymer hydrogenation product of the invention (hereinafter occasionally referred to as component (A)) can be used as a block copolymer composition with the vinyl aromatic hydrocarbon polymer (hereinafter occasionally referred to as component (B)). The weight ratio of component (A) and component (B) is from 99.9/0.1 to 20/80, preferably 99.7/0.3 to 25/75, and more preferably from 99/1 to 30/70. The block copolymer composition excellent in rigidity, blocking resistance and natural shrinkability can be obtained by combining component (A) and component (B) at such a weight ratio.

In the invention, as the vinyl aromatic hydrocarbon polymer, there can be used at least one member selected from the following a) to c):

a) A styrene-based polymer b) A copolymer of a vinyl-based aromatic hydrocarbon and at least one aliphatic unsaturated carboxylic acid selected from an aliphatic unsaturated carboxylic acid, an aliphatic unsaturated carboxylic anhydride and an aliphatic unsaturated carboxylic ester or a derivative thereof, and c) A rubber-modified styrene-based polymer The styrene-based polymer a) used in the invention is one obtained by polymerizing styrene or a monomer copolymerizable therewith (provided that b) is excluded). The monomers copolymerizable with styrene include α-methylstyrene, acrylonitrile, maleic anhydride and the like. The styrene-based polymers include polystyrene, a styrene-α-methylstyrene copolymer, an acrylonitrile-styrene copolymer, a styrene-maleic anhydride copolymer and the like. Particularly preferred examples of the styrene-based polymers include polystyrene. As these styrene-based polymers, there can be generally used polymers having a weight average molecular weight of 50,000 to 500,000. These styrene-based polymers can be used either alone or as a mixture of two or more thereof, and utilized as a rigidity improver. Further, a block copolymer comprising a vinyl aromatic hydrocarbon having a vinyl aromatic hydrocarbon content of 85 to 98% by weight and a conjugated diene and a hydrogenation product thereof, excluding the block copolymer hydrogenation product of the invention, are suitable. It is preferred that the number average molecular weight is from 30,000 to 300,000, preferably from 50,000 to 250,000, and more preferably from 70,000 to 200,000, that the tan δ peak temperature is from 80 to 110° C., preferably from 83 to 105° C., and more preferably from 85 to 100° C., and that the Vicat softening point is from 60 to 85° C., preferably from 65 to 83° C., and more preferably from 68 to 80° C. These can be used as a rigidity and shrinkability improvers.

The aliphatic unsaturated carboxylic acids used in the copolymer b) of a vinyl-based aromatic hydrocarbon and at least one aliphatic unsaturated carboxylic acid selected from an aliphatic unsaturated carboxylic acid, an aliphatic unsaturated carboxylic anhydride and an aliphatic unsaturated carboxylic ester or a derivative thereof include acrylic acid, methacrylic acid, fumaric acid, itaconic acid or maleic acid and the like. Further, the aliphatic unsaturated carboxylic anhydrides include fumaric anhydride, itaconic anhydride, maleic anhydride and the like, and furthermore, the aliphatic unsaturated carboxylic esters include a mono- or di-ester of the above-mentioned aliphatic unsaturated carboxylic acid and an alcohol having 1 to 12 carbon atoms, preferably 2 to 12 carbon atoms. The content of the aliphatic unsaturated carboxylic acid and/or the aliphatic unsaturated carboxylic acid derivative in component (ii) is generally from 5 to 50% by weight, preferably from 8 to 30% by weight, and more preferably from 10 to 25% by weight. As a production method of component b), there can be used a known method for producing a styrene-based resin, for example, a bulk polymerization method, a solution polymerization method, a suspension polymerization method, an emulsion polymerization method or the like. As component b), there can be used a polymer having a weight average molecular weight of 50,000 to 500,000.

For example, the aliphatic unsaturated carboxylic ester of the aliphatic unsaturated carboxylic ester-styrene copolymer b) is one member selected from an ester of an alcohol having 1 to 12 carbon atoms, preferably 2 to 12 carbon atoms and acrylic acid, such as methyl acrylate, ethyl acrylate, propyl acrylate, butyl acrylate, pentyl acrylate or hexyl acrylate, an ester of methacrylic acid, an alcohol having 1 to 12 carbon atoms, preferably 2 to 12 carbon atoms and acrylic acid, and a mono- or di-ester of an α-, β-unsaturated dicarboxylic acid such as fumaric acid, itaconic acid or maleic acid and an alcohol having 1 to 12 carbon atoms, preferably 2 to 12 carbon atoms. The content of the aliphatic unsaturated carboxylic ester in such an aliphatic unsaturated carboxylic ester-styrene copolymer is generally from 5 to 50% by weight, preferably from 8 to 30% by weight, and more preferably from 10 to 25% by weight.

Further, it is recommended that the Vicat softening point of the aliphatic unsaturated carboxylic ester-styrene copolymer used for improving low-temperature shrinkability is from 50 to 95° C., preferably from 55 to 90° C., and more preferably from 60 to 85° C. The Vicat softening point is a value measured in accordance with ASTM-D-1525 (load: 1 Kg, temperature elevation rate: 2° C./min), using a compression-molded product having a thickness of 3 mm as a test piece.

The particularly preferred aliphatic unsaturated carboxylic ester-styrene copolymer is a copolymer mainly comprising n-butyl acrylate and styrene, and an aliphatic unsaturated carboxylic ester-styrene copolymer in which the total amount of n-butyl acrylate and styrene is 50% by weight or more, and more preferably the total amount of n-butyl acrylate and styrene is 60% by weight or more. A heat shrinkable film using the aliphatic unsaturated carboxylic ester-styrene copolymer mainly comprising n-butyl acrylate and styrene has good shrinkability and natural shrinkability.

The rubber-modified styrene-based polymer c) used in the invention is obtained by polymerizing a mixture of a monomer copolymerizable with the vinyl aromatic hydrocarbon and an elastomer, and as polymerization methods, there have been generally conducted suspension polymerization, emulsion polymerization, bulk polymerization, bulk-suspension polymerization and the like. The monomers copolymerizable with the vinyl aromatic hydrocarbon include α-methylstyrene, acrylonitrile, an acrylic ester, a methacrylate, maleic anhydride and the like. Further, as the copolymerizable elastomers, there are used natural rubber, synthetic isoprene rubber, butadiene rubber, styrene-butadiene rubber, high styrene rubber and the like.

These elastomers are contained generally in an amount of 3 to 50 parts by weight based on 100 parts by weight of the vinyl aromatic hydrocarbon or the monomer copolymerizable therewith, dissolved in the monomer or made into a latex form, and subjected to emulsion polymerization, bulk polymerization, bulk-suspension polymerization or the like. Particularly preferred examples of the rubber-modified styrene-based polymers include an impact-resistant rubber-modified styrene-based polymer (HIPS). The rubber-modified styrene-based polymer can be utilized as an improver for rigidity, impact resistance and slipperiness. As these rubber-modified styrene-based polymers, there can be generally used polymers having a weight average molecular weight of 50,000 to 500,000. The amount of the rubber-modified styrene-based polymer added is preferably from 0.1 to 10 parts by weight, taking into account the maintenance of transparency.

It is recommended that the vinyl aromatic hydrocarbon-based polymer used in the invention particularly has an MFR (under conditions G, temperature: 200° C., load: 5 kg) of 0.1 to 100 g/10 min, preferably 0.5 to 50 g/10 min, and more preferably 1 to 30 g/10 min, in terms of molding processability.

At least one member selected from a fatty acid amide, a paraffin a hydrocarbon-based resin and a fatty acid is added as a lubricant to the block copolymer hydrogenation product and composition of the invention in an amount of 0.01 to 5 parts by weight, preferably 0.05 to 4 parts by weight, more preferably 0.1 to 3 parts by weight, based on parts by weight of the block copolymer hydrogenation product, thereby improving blocking resistance.

The fatty acid amides include stearoamide, oleylamide, erucylamide, behenamide, a mono- or bis-amide of a higher fatty acid, ethylenebis-stearoamide, stearyl-oleylamide, N-stearyl-erucamide and the like. These can be used either alone or as a mixture of two or more thereof.

The paraffins and hydrocarbon-based resins include paraffin wax, microcrystalline wax, fluid paraffin, paraffinic synthetic wax, polyethylene wax, combined wax, montan wax, hydrocarbon-based wax, silicone oil and the like. These can be used either alone or as a mixture of two or more thereof.

The fatty acids include a saturated fatty acid, an unsaturated fatty acid and the like. That is to say, they include a saturated fatty acid such as lauric acid, palmitic acid, stearic acid, behenic acid or hydroxystearic acid, an unsaturated fatty acid such as oleic acid, erucic acid or ricinolic acid, and the like. These can be used either alone or as a mixture of two or more thereof.

At least one ultraviolet absorber and light stabilizer selected from a benzophenone-based ultraviolet absorber, a benzotriazole-based ultraviolet absorber and a hindered amine-based light stabilizer is added as an ultraviolet absorber and a light stabilizer to the block copolymer hydrogenation product and composition of the invention in an amount of 0.05 to 3 parts by weight, preferably 0.05 to 2.5 parts by weight, more preferably 0.1 to 2 parts by weight, based on 100 parts by weight of the block copolymer hydrogenation product, thereby improving light resistance.

The benzophenone-based ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2',4,4'-tetrahydroxybenzophenone, 4-dodecyloxy-2-hydroxybenzophenone, 3,5-di-t-butyl-4-hydroxybenzoyl acid, n-hexadecyl ester, bis(5-benzoyl-4-hydroxy-2-methoxyphenyl)methane, 1,4-bis(4-benzoyl-3-hydroxyphenoxy)butane, 1,6-bis(4-benzoyl-3-hydroxyphenoxy)hexane and the like.

The benzotriazole-based ultraviolet absorbers include 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3',4',5',6'-tetrahydrophthalimidomethyl)-5'-methylphenyl]benzotriazole, 2-2'-methylenebis[4-(1,1,3,3-tetramethylbutyl)-6-(2H-benzotriazole-2-yl)phenol], 2-[2-hydroxy-3,5-bis(α,α-dimethylbenzyl)phenyl]-2H-benzotriazole, 2-(2-hydroxy-4-octyloxyphenyl)-2H-benzotriazole, 2-(2H-benzotriazole-2-yl)-4-methyl-6-(3,4,5,6-tetrahydro-phthalimidylmethyl)phenol and the like.

The hindered amine-based light stabilizers include bis(2,2,6,6-tetramethyl-4-piperidyl) sebacate, bis(1,2,6, 6,6,-pentamethyl-4-piperidyl) sebacate, 1-[2-{3-(3,5-di-tertiary butyl-4-hydroxyphenyl)propionyloxy}ethyl]-4-{3-(3,5-di-tertiary butyl-4-hydroxyphenyl)propionyloxy}-2,2, 6,6-tetramethylpiperidine, 8-acetyl-3-dodecyl-7,7,9,9-tetramethyl-1,3,8-triazaspiro[4,5]decane-2,4-dione, 4-benzoyloxy-2,2,6,6-tetramethylpiperidine, a dimethyl succinate-1-(2-hydroxyethyl)-4-hydroxy-2,2,6,6-tetramethylpiperidine polycondensate and the like.

Further, they include poly[[6-1,1,3,3-tetramethylbutyl)imino-1,3,5-triazine-2,4-diyl][(2,2,6,6-tetramethyl-4-piperidyl)imino]hexamethylene[[2,2,6,6-tetramethyl-4-piperidyl]imino]], poly[6-morpholino-s-triazine-2,4-diyl)-[2,2, 6,6-tetramethyl-4-piperidyl)imino]-hexamethylene[(2,2,6, 6-tetramethyl-4-piperidyl)imino]], 2-(3,5-di-tertiary butyl-4-hydroxybenzyl)-2-n-butylmalonic acid bis(1,2,2,6,6-pentamethyl-4-piperidyl), tetraxy(2,2,6,6-tetramethyl-4-piperidyl) 1,2,3,4-butanetetracarboxylate, tetraxy(1,2,2,6,6-pentamethyl-4-piperidyl) 1,2,3,4-butanetetracarboxylate, a condensate of 1,2,3,4-butanetetracarboxylic acid, 1,2,2,6,6-pentamethyl-4-piperidinol and tridecyl alcohol, and the like.

Furthermore, they include a condensate of 1,2,3,4-butanetetracarboxylic acid, 2,2,6,6-tetramethyl-4-piperidinol and tridecyl alcohol, a condensate of 1,2,3,4-butanetetracarboxylic acid, 1,2,2,6,6-pentamethyl-4-piperidinol and β,β,β,β-tetramethyl-3,9-(2,4,8,10-tetraoxaspiro[5,5]undecane)diethanol, a condensate of 1,2,3,4-butanetetracarboxylic acid, 2,2,6,6-tetramethyl-4-piperidinol and β,β,β,β-tetramethyl-3,9-(2,4,8,10-tetraoxaspiro[5,5]undecane)diethanol, an N,N'-bis(3-aminopropyl)ethylenediamine-2,4-bis[N-butyl-N-(1,2,2,6,6-pentamethyl-4-piperidyl)amino]-6-chloro-1,3,5-triazine condensate, a dibutylamine-1,3,5-triazine-N,N-bis(2,2,6,6-tetramethyl-4-piperidyl-1,6-hexamethylenediamine.N-2,2, 6,6-tetramethyl-4-piperidyl)butylamine condensate, 1,2,2,6, 6-tetramethyl-4-piperidyl methacrylate, 2,2,6,6-tetramethyl-4-piperidyl methacrylate and the like.

To the block copolymer hydrogenation product and composition of the invention, there can be added at least one stabilizer selected from 2-[1-(2-hydroxy-3,5-di-t-pentylphenyl)ethyl]-4,6-di-t-pentylphenyl acrylate, 2-t-butyl-6-(3-t-butyl-2-hydroxy-5-methylbenzyl)-4-methylphenyl acrylate and 2,4-bis[(octylthio)methyl]-O— cresol in an amount of 0.05 to 3 parts by weight based on 100 parts by weight of the block copolymer hydrogenation product, and at least one of organic phosphate-based and organic phosphite-based stabilizers such as tris(nonylphenyl) phosphite, 2,2-methylenebis (4,6-di-t-butylphenyl)octyl phosphite, 2-[[2,4, 8,10-tetrakis (1,1-dimethylethyl)dibenzo[d,f][1,3,2]dioxaphosphephin-6-yl]oxy]-N,N-bis[2-[[2,4,8,10-tetrakis(1,1-dimethylethyl) dibenzo[d,f][1,3,2]dioxaphosphephin-6-yl]oxy]-ethyl] ethaneamine and tris(2,4-di-t-butylphenyl) phosphite in an amount of 0.05 to 3 parts by weight based on 100 parts by weight of the block copolymer hydrogenation product.

Various polymers and additives can be added to the block copolymer hydrogenation product and composition of the invention depending on the purpose. Suitable examples of the polymers include a block copolymer elastomer of a vinyl aromatic hydrocarbon and a conjugated diene or a hydrogenation product thereof, a block copolymer of a vinyl aromatic hydrocarbon and a conjugated diene, different from the block copolymer hydrogenation product of the invention, and/or a hydrogenation product thereof, and the like.

In the invention, as the block copolymer elastomer of a vinyl aromatic hydrocarbon and a conjugated diene or the hydrogenation product thereof, there can be used one having a vinyl aromatic hydrocarbon content of less than 50% by weight, preferably from 10 to 50% by weight, and having a structure similar to that of the block copolymer hydrogenation product of the invention. It is blended in an amount of 0.5 to 30 parts by weight, preferably from 1 to 20 parts by weight, based on 100 parts by weight of the block copolymer hydrogenation product of the invention, thereby being able to improve impact resistance, elongation and the like.

In the hydrogenation product of the block copolymer elastomer, the hydrogenation rate of unsaturated double bonds based on the conjugated diene can be arbitrarily selected depending on the purpose, and is not particularly limited. 70% or more, preferably 80% or more, more preferably 90% or more of the unsaturated double bonds based on the conjugated diene in the block copolymer elastomer may be hydrogenated, or only a part thereof may be hydrogenated. When only a part thereof is hydrogenated, it is preferred that the hydrogenation rate is adjusted to 10% to less than 70%, or 15% to less than 65%, or 20% to less than 60% as needed.

As the block copolymer of a vinyl aromatic hydrocarbon and a conjugated diene, which is different from the block copolymer of the invention, and/or the hydrogenation product thereof, there can be used one having a vinyl aromatic hydrocarbon content of 55 to 95% by weight, preferably from 60 to 90% by weight, and having a structure similar to that of the block copolymer hydrogenation product of the invention. It is blended in an amount of 5 to 90 parts by weight, preferably from 10 to 80 parts by weight, based on 100 parts by weight of the block copolymer hydrogenation product of the invention, thereby being able to improve impact resistance, rigidity, elongation and the like.

As the other suitable additives, there can be added softening agents and plasticizers such as a coumarone-indene resin, a terpene resin and an oil, which are described in *Practical Handbook of Additives for Plastics and Rubbers* (Kagaku Kogyo-sha), and further, various stabilizers, pigments, anti-blocking agents, antistatic agents, lubricants and the like. These can be generally added within the range of 0.01 to 5% by weight, and preferably within the range of 0.05 to 3% by weight.

The block copolymer hydrogenation product of the invention and the composition comprising the block copolymer hydrogenation product and the vinyl aromatic hydrocarbon-based polymer can be used as various forming materials and the like for sheets, films, injection molded articles and the like.

A heat shrinkable uniaxially or biaxially stretched film using the block copolymer hydrogenation product and composition of the invention can be obtained by extrusion molding the block copolymer hydrogenation product through an ordinary T-die or circular die in a flat or tube form at 150 to 250° C., preferably at 170 to 220° C., and substantially uniaxially or biaxially stretching the resulting unstretched product.

For example, when uniaxially stretched, it is stretched in an extrusion direction with a calender roll or the like, or in a direction perpendicular to the extrusion direction with a tenter or the like, in the case of a film form or a sheet form. In the case of a tube form, it is stretched in an extrusion direction or circumferential direction of a tube. When biaxially stretched, an extruded film or sheet is longitudinally stretched with a metal roll or the like, and then laterally stretched with a tenter or the like, in the case of a film form or a sheet form. In the case of a tube form, it is stretched in an extrusion direction of a tube and in a circumferential direction of a tube, that is to say, in a direction perpendicular to a tube axis, at the same time or separately.

In the invention, it is preferred that stretching is carried out at a stretching temperature of 60 to 160° C., preferably 80 to 155° C., more preferably 85 to 150° C., longitudinally and/or laterally at a stretching ratio of 1.5 to 8, preferably 2 to 6. The stretching temperature is 60° C. or higher from the viewpoint of breakage at the time of stretching, and 110° C. or lower from the viewpoint of shrinkage characteristics. The stretching ratio is 1.5 or more from the viewpoint of the degree of heat shrinkage, and 8 or less from the viewpoint of stable production. In the case of biaxial stretching, the longitudinal and lateral stretching ratios may be the same or different. Then, it is also possible that a heat shrinkable film uniaxially or biaxially stretched is heat treated at 60 to 160° C., preferably at 80 to 155° C., for a short period of time, for example, for 3 to 60 seconds, preferably for 10 to 40 seconds, as needed, thereby conducting a means for preventing natural shrinkage at room temperature.

In order to use the heat shrinkable film thus obtained as a material for heat shrinkable packaging or a material for a heat shrinkable label, the degree of heat shrinkage at 80° C. in a stretching direction is from 5 to 70%, preferably from 10 to 60%, and more preferably from 15 to 55%. When the degree of heat shrinkage is within such a range, a heat shrinkable film excellent in a balance between the degree of heat shrinkage and the degree of natural shrinkage is obtained. In the invention, the degree of heat shrinkage at 80° C. is a measure of low-temperature shrinkability, and is the degree of heat shrinkage in each stretching direction of a formed article at the time when the uniaxially or biaxially stretched film is immersed in a heat medium not inhibiting the characteristics of the formed article, such as hot water, silicone oil, glycerol or the like at 80° C. for 5 minutes. In the invention, within the above-mentioned range of the degree of heat shrinkage, it is recommended that the degree of natural shrinkage of the heat shrinkable film itself is 3.0% or less, preferably 2.5% or less, and more preferably 2.0% or less. The degree of natural shrinkage of the heat shrinkable film itself as used herein means a value obtained by allowing the heat shrinkable film having a degree of heat shrinkage within the above-mentioned range to stand at 35° C. for 3 days, and calculating by an equation described later.

Further, in the uniaxially or biaxially stretched film of the invention, it is necessary as a heat shrink packaging material that the tensile modulus in the stretching direction is from 7,000 to 30,000 kg/cm², and preferably from 10,000 to 25,000 kg/cm². The tensile modulus in the stretching direction is 7,000 kg/cm² or more in view of the problem of settling in a shrink packaging process, and 30,000 kg/cm² or less in view of the problem of impact resistance of the film.

When the uniaxially or biaxially stretched film of the invention is used as a heat shrinkable packaging material, heating at a temperature of 130 to 300° C., preferably at 150 to 250° C., for several seconds to several minutes, preferably for 1 to 60 seconds, can be effected to undergo heat shrinking in order for attain the objective degree of heat shrinkage.

The heat shrinkable film of the invention may be a multilayer laminate having at least two-layer, preferably at least three-layer structure. Specific examples of types of usage as the multilayer laminates include, for example, types disclosed in JP-B-3-5306. The block copolymer hydrogenation product or composition of the invention may be used in an intermediate layer or both outer layers. When the block copolymer hydrogenation product or composition of the invention is used in the multilayer film, there is no particular limitation on a layer other than the film layer using the block copolymer hydrogenation product or composition of the invention. It may be a multi-layer laminate in which the block copolymer hydrogenation product and/or composition of the invention are combined with the block copolymer hydrogenation product and/or composition of the invention different in constituting components, composition or the like, a block copolymer other than the invention and/or a hydrogenation product thereof, or a composition of a block copolymer other than the invention and/or a hydrogenation product thereof and the above-mentioned vinyl aromatic hydrocarbon-based polymer. In addition, there is mentioned at least one component selected from polypropylene, polyethylene, an ethylenic polymer (an ethylene-vinyl acetate copolymer, an ethylene-ethyl acrylate copolymer, an ethylene-acrylic acid copolymer or the like), an ionomer resin, a nylon-based resin, a polyester-based resin, a polymethyl methacrylate resin, an ABS resin, the above-mentioned vinyl aromatic hydrocarbon-based polymer and the like. However, preferred is a polyester-based resin, a block copolymer other than the invention or a hydrogenation product thereof, a composition of a block copolymer other than the invention and/or a hydrogenation product thereof and the above-mentioned vinyl aromatic hydrocarbon-based polymer, or the above-mentioned vinyl aromatic hydrocarbon-based polymer. When these are used as a surface layer, an adhesive layer may be provided between the intermediated layer and the surface layer.

In the invention, the preferred heat shrinkable multilayer film is a heat shrinkable multilayer film having a layer comprising the block copolymer hydrogenation product or composition of the invention in at least one layer of the multilayer film, wherein the degree of heat shrinkage at 80° C. in the stretching direction is from 5 to 70%, preferably from 10 to 60%, and more preferably from 15 to 55%.

The thickness of the heat shrinkable film and heat shrinkable multilayer film of the invention is from 10 to 300 μm, preferably from 20 to 200 μm, and more preferably from 30 to 100 μm, and it is recommended that the thickness ratio of the inner layer and both surface layers is from 5/95 to 45/55, and preferably from 10/90 to 35/65.

The heat shrinkable film of the invention can be utilized for various applications, for example, packages of fresh food and confectionery, packages of clothes, writing materials and the like, and the like, taking advantage of its characteristics. Particularly preferred examples of the applications include utilization as a so-called material for a heat shrinkable label, in which letters or designs are printed on the uniaxially stretched film of the block copolymer specified in the invention, and then, the film is closely adhered by heat shrinkage to a surface of an article to be packaged, such as a plastic molded article, a metal product, a glass vessel or a porcelain, to use.

In particular, the uniaxially stretched heat shrinkable film of the invention is excellent in solvent resistance, low-temperature shrinkability, rigidity and natural shrinkability, so that it can be suitably utilized as a heat shrinkable label material for a material extremely different from the block copolymer of the invention in the coefficient of thermal expansion, water absorption properties or the like, for example, a vessel using as a constituent material at least one member selected from metal, ceramic, glass, paper, a polyolefinic resin such as polyethylene, polypropylene or polybutene, a polymethacrylic ester-based resin, a polycarbonate-based resin, a polyester-based resin such as polyethylene terephthalate or polybutylene terephthalate and a polyamide-based resin, as well as a heat shrinkable label material for such a plastic molded article as to deform on heating at high temperatures.

Materials constituting plastic vessels for which the heat shrinkable film of the invention can be utilized include polystyrene, rubber-modified impact-resistant polystyrene (HIPS), a styrene-butyl acrylate copolymer, a styrene-acrylonitrile copolymer, a styrene-maleic anhydride copolymer, an acrylonitrile-butadiene-styrene copolymer (ABS), a methacrylic ester-butadiene-styrene copolymer (MBS), a polyvinyl chloride-based resin, a polyvinylidene chloride-based resin, a phenol resin, a urea resin, a melamine resin, an epoxy resin, an unsaturated polyester resin, a silicone resin and the like, as well as the above-mentioned resins. These plastic vessels may be formed of either a mixture of two or more of the resins or a laminate thereof.

When the heat shrinkable film of the invention is used as the material for a heat shrinkable label, the degree of heat shrinkage at 80° C. in a direction perpendicular to a stretching direction is less than 20%, and preferably 10% or less. Accordingly, to conduct uniaxial stretching for the heat shrinkable label in the invention means to conduct stretching treatment so as to give a degree of heat shrinkage at 80° C. in a stretching direction of 5 to 60% and a degree of heat shrinkage in a direction perpendicular to the stretching direction of less than 20%.

EXAMPLES

The invention will be described in greater detail with reference to the following examples, but these examples and the like should not be construed as limiting the scope of the invention.

Table 1 shows block copolymer hydrogenation products, Table 2 shows styrene-n-butyl acrylate copolymers as vinyl aromatic hydrocarbon-based polymers and general-purpose polystyrene (GPPS), and Table 3 shows block copolymer hydrogenation products (also including non-hydrogenation products) excluding the block copolymer hydrogenation product of the invention, as vinyl aromatic hydrocarbon polymers.

(Preparation of Block Copolymer A-1 to A-13)

Block copolymers before hydrogenation were hydrogenated in a cyclohexane solvent using n-butyllithium as a catalyst and tetramethylethylenediamine as a randomizing agent (except for A-11) to produce hydrogenated block copolymers having hydrogenated block copolymer structures, styrene contents (% by weight), number average molecular weights, block rates, peak molecular weights of block styrene, component amounts of block styrene of 50,000 or less and 15,000 or less, tan δ peak temperatures and specific hydrogenation rates shown in Table 1. The styrene content was adjusted by the amounts of styrene and butadiene added, the number average molecular weight by the amount of the catalyst, the block rate by the composition ratio of a polystyrene moiety, the peak molecular weight of block styrene and the component amounts of block styrene of 50,000 or less and 15,000 or less by the composition ratio of a polystyrene moiety and the number molecular weight of the block copolymer, and the tan δ peak temperature by randomness of a copolymer moiety of styrene and butadiene (including isoprene) and a microstructure of butadiene (including isoprene). In the preparation of the block copolymers, monomers diluted with cyclohexane to a concentration of 25% by weight were used.

As the hydrogenation catalyst, there was used a hydrogenation catalyst obtained by charging a nitrogen-substituted reaction vessel with 1 liter of cyclohexane dried and purified, adding 100 mmol of bis(η5-cyclopentadienyl)titanium dichloride, and adding an n-hexane solution containing 200 mmol of trimethylaluminum with thoroughly stirring, followed by reaction at room temperature for about 3 days.

1) Block Copolymer Hydrogenation Product A-1

Using an autoclave equipped with a stirrer, 0.13 part by weight of n-butyllithium and 0.05 part by weight of tetramethylethylenediamine were added to a cyclohexane solution containing 20 parts by weight of styrene under an atmosphere of nitrogen gas, and polymerization was conducted at 70° C. for 20 minutes. Then, a cyclohexane solution containing 12 parts by weight of styrene and 32 parts by weight of 1,3-butadiene was continuously added for 50 minutes, and polymerization was conducted at 70° C., followed by keeping for 5 minutes. Then, a cyclohexane solution containing 36 parts by weight of styrene was added, followed by polymerization at 70° C. for 25 minutes. Then, the hydrogenation catalyst was added to a solution of the block copolymer obtained above in an amount of 100 ppm as titanium based on 100 parts by weight of the block copolymer, and hydrogenation reaction was conducted at a hydrogen pressure of 0.7 MPa at a temperature of 65° C. Thereafter, methanol was added, and then, octadecyl-3-(3,5-di-t-butyl-4-hydroxyphenyl) propionate was added as a stabilizer in an amount of 0.3 part by weight based on 100 parts by weight of the block copolymer, followed by desolvation to obtain a block copolymer hydrogenation product. The hydrogenation rate of block copolymer hydrogenation product A-1 was adjusted to a hydrogenation rate of 97% by the amount of hydrogen.

2) Block Copolymer Hydrogenation Products A-2 to A-10, A-12 and A-13

Block copolymer hydrogenation products A-2 to A-10, A-12 and A-13 were prepared in the same manner as with A-1 (the addition rate of styrene and butadiene (including isoprene) and the polymerization temperature were the same).

3) Block Copolymer Hydrogenation Product A-11

Using an autoclave equipped with a stirrer, 0.13 part by weight of n-butyllithium was added to a cyclohexane solution containing 20 parts by weight of styrene under an atmosphere of nitrogen gas, and polymerization was conducted at 85° C. for 20 minutes. Then, a cyclohexane solution containing 12 parts by weight of styrene and 32 parts by weight of 1,3-butadiene was continuously added for 65 minutes, and polymerization was conducted at 85° C., followed by keeping for 5 minutes. Then, a cyclohexane solution containing 36 parts by weight of styrene was added, followed by polymerization at 85° C. for 25 minutes. Then, the hydrogenation catalyst was added to a solution of the block copolymer obtained above in an amount of 100 ppm as titanium based on 100 parts by weight of the block copolymer, and hydrogenation reaction was conducted at a hydrogen pressure of 0.7 MPa at a temperature of 65° C. Thereafter, methanol was added, and then, octadecyl-3-(3,5-di-t-butyl-4-hydroxyphenyl) propionate was added as a stabilizer in an amount of 0.3 part by weight based on 100 parts by weight of the block copolymer, followed by desolvation to obtain a block copolymer hydrogenation product. The hydrogenation rate of block copolymer hydrogenation product A-8 was adjusted to a hydrogenation rate of 97% by the amount of hydrogen.

The hydrogenation rate of the resulting block copolymer hydrogenation product A-11 was 97%, the crystallization peak temperature was 25° C., and the heat quantity of a crystallization peak was 20 J/g.

(Preparation of Aliphatic Unsaturated Carboxylic Ester-Styrene Copolymer)

Styrene-n-butyl acrylate copolymers B-1 and B-2 were produced by adding 5 kg of styrene and n-butyl acrylate at ratios shown in Table 2 to a 10-liter autoclave equipped with a stirrer, concurrently charging the autoclave with kg of ethylbenzene and a specific amount of 1,1-bis(t-butylperoxy) cyclohexane for adjusting the MRF, conducting polymerization at 110 to 150° C. for 2 to 10 hours, and then, recovering unreacted styrene, n-butyl acrylate and ethyl benzene with a vent extruder. B-1 thus obtained had an MRF of 3.0 g/10 min, and B-2 had an MRF of g/10 min.

(Preparation of Block Copolymer Hydrogenation Products C-1 to C-4)

Block copolymers before hydrogenation were hydrogenated in a cyclohexane solvent using n-butyllithium as a catalyst and tetramethylethylenediamine as a randomizing agent to produce hydrogenated block copolymers having styrene contents (% by weight), number average molecular weights, tan δ peak temperatures and Vicat softening points shown in Table 3. In the preparation of the block copolymers, monomers diluted with cyclohexane to a concentration of 25% by weight were used.

Further, as the hydrogenation catalyst, there was used a hydrogenation catalyst obtained by charging a nitrogen-substituted reaction vessel with 1 liter of cyclohexane dried and purified, adding 100 mmol of bis(η5-cyclopentadienyl)titanium dichloride, and adding an n-hexane solution containing 200 mmol of trimethylaluminum with thoroughly stirring, followed by reaction at room temperature for about 3 days.

1) Hydrogenated Copolymer C-1

Using an autoclave equipped with a stirrer, 0.052 part by weight of n-butyllithium and 0.05 part by weight of tetramethylethylenediamine were added to a cyclohexane solution containing 15 parts by weight of styrene under an atmosphere of nitrogen gas, and polymerization was conducted at 75° C. for 15 minutes, followed by keeping for 5 minutes. Then, a cyclohexane solution containing 62 parts by weight of styrene and 8 parts by weight of 1,3-butadiene was continuously added for 70 minutes, and polymerization was conducted at 75° C., followed by keeping for 5 minutes.

Then, a cyclohexane solution containing 15 parts by weight of styrene was added, and polymerization was conducted at 75° C. for 15 minutes, followed by keeping for 5 minutes. Then, the hydrogenation catalyst was added to a solution of the block copolymer obtained above in an amount of 50 ppm as titanium based on 100 parts by weight of the block copolymer, and hydrogenation reaction was conducted at a hydrogen pressure of 0.7 MPa at a temperature of 70° C. Thereafter, methanol was added, and then, octadecyl-3-(3,5-di-t-butyl-4-hydroxyphenyl) propionate was added as a stabilizer in an amount of 0.3 part by weight based on 100 parts by weight of the polymer, followed by desolvation to obtain a hydrogenated block copolymer C-1. The hydrogenation rate of hydrogenated block copolymer C-1 was adjusted to a hydrogenation rate of 97% by the amount of hydrogen.

2) Hydrogenated Block Copolymers C-2 to C-4

Hydrogenated block copolymers C-2 to C-4 were prepared in the same manner as with C-1 (the addition rate of styrene and butadiene and the polymerization temperature were the same, provided that C-4 was not hydrogenated) at compositions of styrene and butadiene shown in Table 3.

(Measurement-Evaluation Methods)

Measurement and evaluation described in Examples and Comparative Examples were made by the following methods:

1) Styrene Content

The styrene content of a block copolymer hydrogenation product was determined by precisely weighing the block copolymer hydrogenation product and dissolving it in 100 ml of chloroform, measuring the absorbance using an ultraviolet spectrophotometer (apparatus name: UV-2450; manufactured by Shimadzu Corporation), and finding the styrene amount from a previously prepared calibration curve.

2) Block Rate

The block styrene content was measured by a method of oxidatively degrading a block copolymer before hydrogenation with t-butyl hydroperoxide using osmium tetraoxide as a catalyst (a method described in I. M. Kolthoff et al., *J. Polym. Sci.*, 1, 429 (1946)). Further, the block rate was determined from the following equation, using vinyl aromatic hydrocarbon polymer block components (provided that vinyl aromatic hydrocarbon polymer block components having an average polymerization degree of about 30 or less were excluded) obtained by the same method.

Block rate (% by weight)=(the weight of vinyl aromatic hydrocarbon polymer blocks in a block copolymer/the weight of the whole vinyl aromatic hydrocarbons in the block copolymer)×100

3) Block Styrene Peak Molecular Weight

The block styrene peak molecular weight was measured by dissolving the vinyl aromatic hydrocarbon polymer block components obtained in the above 2) in a tetrahydrofuran solvent and using gel permeation chromatography (a GPC apparatus (HLC-8220 GPC) and a column (TSK-GELHHR series); manufactured by Tosoh Corporation, Japan) in a conventional method. Monodisperse polystyrene for GPC was subjected to GPC measurement, and the peak molecular weight was read from a chromatochart measured, based on calibration curves of the peak count number thereof and the number average molecular weight of the monodisperse polystyrene.

4) Amounts of Block Styrene of 50000 or Less and 15000 or Less

The total area of a molecular weight distribution curve was determined from the chromatochart obtained in the above 3), and a value obtained by dividing each area of molecular weights of 50000 or less and 15000 or less by the total area of the molecular weight distribution curve was represented in percentage.

5) Number Average Molecular Weight

The molecular weight of a block copolymer hydrogenation product was measured using the above-mentioned GPC apparatus. Tetrahydrofuran was used as a solvent, and measurement was made at 35° C. The number average molecular weight was determined using a calibration curve prepared by using commercially available standard polystyrene having a known weight average molecular weight and number average molecular weight.

6) Hydrogenation Rate

Using a block copolymer hydrogenation product, measurement was made by using a nuclear magnetic resonance apparatus (apparatus name: DPX-400; manufactured by Bruker, Germany).

7) Crystallization Peak and Heat Quantity of Crystallization Peak

The crystallization peak and heat quantity of crystallization peak of a block copolymer hydrogenation product were measured with a DSC (apparatus name: DSC 3200S; manufactured by MacScience Co., Ltd.). The temperature was elevated from room temperature to 150° C. at a temperature elevation rate of 30° C./min, and then, decreased to −100° C. at a temperature decreasing rate of 10° C./min to measure a crystallization curve, thereby confirming the presence or absence of the crystallization peak. Further, when the crystallization peak existed, the temperature at which the peak appeared was taken as the crystallization peak temperature, and the heat quantity of crystallization peak was measured.

8) Tan δ Peak Temperature

Using a viscoelasticity measuring analyzer, DVE-V4, manufactured by Rheology Co., Ltd., measurement was made under conditions of an oscillation frequency of 35 Hz and a temperature elevation rate of 3° C./min, using a test piece having a thickness of 2 mm. When a plurality of tan δ peak temperatures existed, the temperature on the lowest temperature side was taken as the tan δ peak temperature.

9) Vicat Softening Temperature

A compression-molded article having a thickness of 3 mm was used as a test piece, and measurement was made (load: 1 kg, temperature elevation rate: 2° C./min) based on ASTM-D-1525.

10) Degree of Shrinkage

A stretched film was immersed in a silicone oil of 80° C. for 10 seconds, and the degree of shrinkage at 80° C. was calculated according to the following equation:

Degree of heat shrinkage (%)=$[(L-L1)/L]\times 100$

L: Length before shrinkage, L1: Length after shrinkage

11) Degree of Natural Shrinkage

A stretched film having a degree of shrinkage measured at 80° C. of 40% was allowed to stand at 35° C. for 3 days, and the degree of natural shrinkage was calculated according to the following equation:

Degree of natural shrinkage (%)=$[(L2-L3)/L2]\times 100$

L2: Length before shrinkage, L3: Length after shrinkage

The lower the degree of natural shrinkage, the more excellent natural shrinkability.

12) Tensile Modulus

Measurement was made at a tensile rate of 10 mm/min in a direction perpendicular to a stretching direction of a film. A strip piece was used as a test piece. The width thereof was adjusted to 10 mm, and the distance between chucks was adjusted to 100 cm. The measuring temperature was 23° C. for tensile modulus, and −10° C. for elongation.

13) Elongation at −10° C.

Measurement was made at a tensile rate of 100 mm/min in a direction perpendicular to a stretching direction of a film. A strip piece was used as a test piece. The width thereof was adjusted to 15 mm, and the distance between chucks was adjusted to 40 cm. The measuring temperature was −10° C.

14) Haze

A surface of a sheet before stretching was coated with liquid paraffin, and measurement was made based on ASTM-D-1003.

15) Blocking Property

Two 5-cm (length)×5-cm (breadth) heat shrinkable multi-layer films were laminated with each other, and allowed to stand at 40° C. for 7 days with a load of 100 $g/cm^2$ applied. Then, a blocking state of the films was visually judged.

<Criteria of Judgment>

A: No blocking is observed.

B: Blocking is observed.

16) Fusion Bonding in Hot Water

Stretched films were each wrapped around respective glass bottles having a diameter of about 8 cm, and allowed to stand in hot water at 70° C. for 5 minutes in the stacking form of three straw bags. The criteria of judgment are as follows:

AA: The films are not fusion bonded to each other at all.

A: The films are fusion bonded to each other, but easily separated from each other B: The films are fusion bonded to each other, and not easily separated from each other.

17) Solvent Resistance

A 5-cm×5-cm (length×breadth) stretched film was immersed in a solvent having an ethyl acetate/isopropyl alcohol ratio of 40/60 at 23° C., and the time until the start of shrinkage was visually measured. The criteria of judgment are as follows:

AA: 10 seconds or more

A: 5 seconds to less than 10 seconds

B: Less than 5 seconds

18) Fish Eye (FE)

A block copolymer hydrogenation product was continuously sheet formed to a sheet having a thickness of 0.3 mm, using a 40-mm sheet extruder under conditions of an extrusion temperature of 240° C. for 6 hours. The number of FEs having a size of 0.5 mm or more per a sheet area of 300 $m^2$ after 5 minutes from the start of operation and that after 6 hours therefrom were each counted, and evaluation was made by the difference in the number of FEs therebetween (A: the difference is less than 50, B: the difference is 50 or more).

Examples 1 to 6 and Comparative Examples 1 to 7

In the measurement of the heat shrinkable film performances, compositions comprising block copolymers: A-1 to A-11 shown in Table 1, other block copolymers: B-4 (manufactured by Asahi Chemical Industry Co., Ltd. a styrene-butadiene-based block copolymer, Tufprene 126) and B-5 (manufactured by Asahi Chemical Industry Co., Ltd., a styrene-butadiene-based hydrogenated block copolymer, Tuftec 1041), styrene-n-butyl acrylate copolymers: B-1 and B-2, general-purpose polystyrene: B-3 (manufactured by A&M Styrene Co. Ltd., A&M Polystyrene 685), which are shown in Table 2, and block copolymers C-1 to C-4 shown in Table 3, were each molded to a sheet form having a thickness of 0.25 mm at 200° C. according to blending formulations shown in Table 4, using a 40-mm extruder, and then, each sheet was transversely uniaxially stretched at a stretching ratio of 5 at a stretching temperature of 87° C., using a tenter, thereby obtaining a heat shrinkable film having a thickness of about 55 μm. The film performances of these heat shrinkable films are shown in Table 4. It is seen that the performances of the heat shrinkable films of the invention are excellent in rigidity represented by tensile modulus, low-temperature shrinkability represented by the degree of heat shrinkage at 80° C., natural shrinkability, elongation at −10° C., fusion bonding in hot water and transparency represented by haze. The sheet and film performances shown in Table 4 were made by the above-mentioned methods.

Example 7

Compounded compositions shown in Table 5 were extruded through a T-die to form a three-layer sheet having the compositions as an internal layer and surface and back layers, and the sheet was longitudinally stretched 1.2 times to form a sheet having a thickness of 0.25 mm. Then, the sheet was transversely stretched 5 times with a tenter to obtain a heat shrinkable film having a thickness of about 50 μm. The thickness ratio (%) of the internal layer and the surface and back layers was 15 (surface layer)/70 (internal layer)/15 (back layer). The performances of the resulting three-layer heat shrinkable films are shown in Table 5. Adekastab LA-32 (manufactured by Asahi Denka Co., Ltd.) was added as an ultraviolet absorber, and stearoamide was added as a lubricant, each in an amount of 0.2 part by weight per 100 parts by weight of the surface and back layers.

TABLE 1

|  | Styrene Content (% by weight) | Structure of Hydrogenated Block Copolymer (Before Hydrogenation), Each Numerical Value in Parentheses Represents Composition Ratio. | Number Average Molecular Weight | Block Rate (% by weight) |
| --- | --- | --- | --- | --- |
| A-1 | 68 | S-S/B-S (20-12/32-36) | 62000 | 82 |
| A-2 | 57 | S-S/B-S-S/B-S/B-S (10-8/5-7-7/33-7/5-18) | 58000 | 61 |
| A-3 | 57 | S-S/B-S-S/B-S/B-S (10-8/5-7-7/33-7/5-18) | 58000 | 61 |
| A-4 | 75 | S-S/B-S (25-14/25-36) | 83000 | 81 |
| A-5 | 82 | S-S/B-B-S (25-12/15-3-45) | 88000 | 86 |
| A-6 | 72 | B-S-S/B/I-S (3-30-14/21/4-28) | 72000 | 81 |
| A-7 | 70 | S-S/B-S (10-50/30-10) | 83000 | 29 |
| A-8 | 68 | S-B/S-S/B-S (11-6/16-30/16-11) | 130000 | 32 |
| A-9 | 68 | S-S/B-S (21-26/32-21) | 110000 | 60 |
| A-10 | 72 | S-S/B-S (25-28/22-25) | 76000 | 70 |
| A-11 | 68 | S-S/B-S (20-12/32-36) | 63000 | 82 |
| A-12 | 97 | S-S/B-S (41-15/3-41) | 143000 | 98 |
| A-13 | 53 | S-B-S (23-47-30) | 63000 | 100 |

|  | Peak Molecular Weight of Block Styrene | Amounts of Block Styrene Having a Molecular Weight of 50000 or Less (% by weight) | Amounts of Block Styrene Having a Molecular Weight of 15000 or Less (% by weight) | Tanδ Peak Temperature (° C.) | Hydrogenation Rate (% by weight) |
| --- | --- | --- | --- | --- | --- |
| A-1 | (1) 11000 (2) 25000 | 98 | 42 | −17 | 97 |
| A-2 | (1) 10000 | 100 | 67 | −52 | 36 |
| A-3 | (1) 10000 | 400 | 67 | −43 | 52 |
| A-4 | (1) 18000 (2) 32000 | 91 | 26 | −25 | 82 |
| A-5 | (1) 20000 (2) 42000 | 85 | 24 | −20 | 72 |
| A-6 | (1) 22000 | 100 | 20 | −38 | 80 |
| A-7 | (1) 9000 | 100 | 91 | 19 | 95 |
| A-8 | (1) 15000 | 100 | 65 | −18 | 96 |
| A-9 | (1) 24000 | 96 | 38 | −6 | 94 |
| A-10 | (1) 21000 | 100 | 21 | 5 | 97 |
| A-11 | (1) 12000 (2) 25000 | 96 | 37 | −1 | 97 |
| A-12 | (1) 60000 | 24 | 3 | 110 | 97 |
| A-13 | (1) 18000 | 100 | 48 | −64 | 10 |

*1: S represents a polystyrene moiety, B represents a polybutadiene moiety, B/S represents a butadiene-styrene copolymer moiety, and B/I/S represents a butadiene-isoprene-styrene copolymer moiety.

TABLE 2

|  | Styrene Content (% by weight) |
|---|---|
| B-1 | 79 |
| B-2 | 88 |
| B-3 | 100 |

B-1, 2: Styrene-n-butyl acrylate copolymers
B-3: A&M Polystyrene 685 (manufactured by A&M Styrene Co. Ltd.)

TABLE 3

|  | Styrene Content (% by weight) | Structure of Hydrogenated Block Copolymer (Before Hydrogenation), Each Numerical Value in Parentheses Represents Composition Ratio. | Number Average Molecular Weight | Tanδ Peak Temperature (° C.) | Vicat Softening Temperature (° C.) | Hydrogenation Rate (% by weight) |
|---|---|---|---|---|---|---|
| C-1 | 91 | S-S/B-S (15-62/8-15) | 148000 | 97 | 73 | 97 |
| C-2 | 89 | B-S-S/B-S (4-14-61/170-14) | 152000 | 91 | 75 | 52 |
| C-3 | 91 | S-B-S/B-B-S (10-2-71/5-2-10) | 156000 | 96 | 79 | 30 |
| C-4 | 92 | S-B-S/B-B-S (10-2-72/4-2-10) | 161000 | 97 | 81 | 0 |

* S represents a polystyrene moiety, B represents a polybutadiene moiety, and S/B represents a styrene-butadiene copolymer moiety.

TABLE 4

|  |  | Example 1 | Example 2 | Example 3 | Example 4 | Example 5 | Example 6 |
|---|---|---|---|---|---|---|---|
| Blending Formulation | Kind and Amount (% by weight) of Block Copolymer (A) | A-1<br>40 | A-2<br>40 | A-3<br>30 | A-4<br>50 | A-5<br>30 | A-6<br>45 |
|  | Kind and Amount (% by weight) of Styrene-based Resin (B) etc. | C-1/B-5<br>55/5 | C-4<br>60 | C-1/B-4<br>60/10 | B-1/B-2<br>40/10 | C-2/B-4<br>55/15 | C-3/B-5<br>50/5 |
| Sheet-Film Performance | Tensile modulus (Kg/cm$^2$) | 13800 | 14000 | 14200 | 14200 | 14400 | 14100 |
|  | Elongation at −10° C. | 450 | 460 | 510 | 480 | 350 | 440 |
|  | Haze (%) | 1.1 | 0.8 | 1.3 | 0.9 | 1.6 | 1.7 |
|  | Degree of Shrinkage at 80° C. (%) | 50 | 39 | 48 | 48 | 41 | 43 |
|  | Degree of Natural Shrinkage (%) | 1.9 | 2.4 | 2.0 | 2.1 | 2.7 | 2.5 |
|  | Fusion Bonding in Hot Water | A | A | A | AA | A | A |
|  | Solvent Resistance | AA | A | A | AA | AA | AA |

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Blending Formulation | Kind and Amount (% by weight) of Block Copolymer (A) | A-7<br>45 | A-8<br>40 | A-9<br>40 | A-10<br>50 | A-11<br>40 | A-12<br>50 | A-13<br>50 |
|  | Kind and Amount (% by weight) of Styrene-based Resin (B) Etc. | B-1/B-3<br>50/5 | C-1/B-5<br>55/5 | C-1/B-5<br>55/5 | B-1/B-2<br>40/10 | C-1/B-5<br>55/5 | B-2<br>50 | C-3/B-5<br>45/5 |
| Sheet-Film Performance | Tensile modulus (Kg/cm$^2$) | 13700 | 12000 | 12800 | 13700 | 14700 | 22300 | 11200 |
|  | Elongation at −10° C. | 10 or less | 35 | 110 | 20 | 90 | 10 or less | 490 |
|  | Haze (%) | 0.6 | 1.2 | 1.2 | 0.9 | 1.3 | 0.7 | 3.4 |
|  | Degree of Shrinkage at 80° C. (%) | 41 | 55 | 54 | 47 | 52 | 32 | 54 |
|  | Degree of Natural Shrinkage (%) | 2.2 | 1.7 | 1.8 | 2.0 | 1.6 | 4.2 | 2.0 |
|  | Fusion Bonding in Hot Water | A | A | A | A | A | AA | A |
|  | Solvent Resistance | AA | AA | AA | AA | AA | A | B |

B-4: Tufprene 126 (manufactured by Asahi Chemical Industry Co., Ltd.)
B-5: Tuftec 1041 (manufactured by Asahi Chemical Industry Co., Ltd.)

TABLE 5

|  |  |  | Example 7 |
|---|---|---|---|
| Surface Layer-Back layer | Block Copolymer Hydrogenation Product | (% by weight) | A-4<br>50 |
|  | Styrene-based Resin etc. | (% by weight) | C-1<br>40 |
|  |  | (% by weight) | B-5<br>10 |
| Internal Layer | Block Copolymer Hydrogenation Product | (% by weight) | A-1<br>40 |
|  | Styrene-based Resin etc. | (% by weight) | C-1<br>55 |
|  | Styrene-based Resin etc. | (% by weight) | B-5<br>5 |
| Physical Properties | Tensile modulus | kgf/cm$^2$ | 14000 |
|  | Elongation at −10° C. | % | 440 |
|  | Haze Value | % | 1.2 |
|  | Degree of Shrinkage at 80° C. | % | 48 |
|  | Degree of Natural Shrinkage | % | 1.7 |
|  | Fusion Bonding in Hot Water |  | A |
|  | Solvent Resistance |  | AA |
|  | Blocking Property |  | A |
|  | FE |  | A |

While the invention has been described in detail and with reference to specific embodiments thereof, it will be apparent to one skilled in the art that various changes and modifications can be made therein without departing from the spirit and scope thereof.

This application is based on Japanese Patent Application No. 2005-110490 filed on Apr. 7, 2005, and the contents thereof are herein incorporated by reference.

INDUSTRIAL APPLICABILITY

The heat shrinkable film using the block copolymer hydrogenation product of the invention is transparent and excellent in solvent resistance, rigidity, natural shrinkability, low-temperature shrinkability, fusion bonding in hot water and low-temperature elongation. Accordingly, it can achieve thinning of the film, and dimensional stability and low-temperature shrinkability at the same time, and can be suitably utilized for drink container packaging, cap seals, various labels and the like.

The invention claimed is:

1. A block copolymer hydrogenation product having a weight ratio of a vinyl aromatic hydrocarbon and a conjugated diene of 65/35 to 90/10, a number average molecular weight measured by gel permeation chromatography (GPC) of 30,000 to 500,000 and a hydrogenation rate of 45% or more,
wherein the vinyl aromatic hydrocarbon incorporated into said hydrogenation product has a block rate of 75 to 98% by weight,
wherein relative to the weight of the total vinyl aromatic hydrocarbon polymer blocks, the ratio of vinyl aromatic hydrocarbon polymer blocks having a molecular weight of 50,000 or less is 85% by weight or more and the ratio of vinyl aromatic hydrocarbon polymer blocks having a molecular weight of 15,000 or less is from 10 to 60% by weight, and
wherein at least one peak temperature of function tan δ in a dynamic viscoelasticity measurement of said hydrogenation product is present within the range of exceeding −70° C. to −15° C. and at least one vinyl aromatic hydrocarbon polymer block having a peak molecular weight within the molecular weight range of 5,000 to 30,000 is incorporated.

2. The block copolymer hydrogenation product according to claim 1, wherein the ratio of vinyl aromatic hydrocarbon polymer blocks having a molecular weight of 15,000 or less relative to the weight of the total vinyl aromatic hydrocarbon polymer blocks is from 10 to 50% by weight.

3. The block copolymer hydrogenation product according to claim 1, wherein said block copolymer hydrogenation product has a hydrogenation rate of 60% or more.

4. The block copolymer hydrogenation product according to claim 1, wherein the block rate of the vinyl aromatic hydrocarbon incorporated into said hydrogenation product is from exceeding 80% by weight to 95% by weight.

5. The block copolymer hydrogenation product according to claim 1, wherein the content of short-chain vinyl aromatic hydrocarbon polymer moieties having a vinyl aromatic hydrocarbon unit number ranging from 1 to 3 is from 1 to 25% by weight based on the total amount of the vinyl aromatic hydrocarbons constituting said block copolymer hydrogenation product.

6. The block copolymer hydrogenation product according to claim 1, wherein at least one polymer block selected from the group consisting of (i) a copolymer block comprising isoprene and 1,3-butadiene, (ii) a copolymer block comprising isoprene and a vinyl aromatic hydrocarbon and (iii) a copolymer block comprising isoprene, 1,3-butadiene and a vinyl aromatic hydrocarbon is incorporated into said block copolymer hydrogenation product, and the weight ratio of butadiene and isoprene in said block copolymer hydrogenation product is 3/97 to 90/10.

7. The block copolymer hydrogenation product according to claim 1, wherein said block copolymer hydrogenation product has a crystallization peak in a temperature region of 0° C. to 60° C., in a differential scanning calorimetry (DSC) chart.

8. A composition comprising (A) the block copolymer hydrogenation product according to claim 1 and (B) a vinyl aromatic hydrocarbon-based polymer, wherein the weight ratio of component (A) and component (B) is from 99.9/0.1 to 20/80.

9. The composition according to claim 8, wherein the vinyl aromatic hydrocarbon-based polymer (B) is at least one member selected from the group consisting of the following a) to c):
  a) a styrene-based polymer,
  b) a copolymer of a vinyl aromatic hydrocarbon and at least one aliphatic unsaturated carboxylic acid selected from the group consisting of an aliphatic unsaturated carboxylic acid, an aliphatic unsaturated carboxylic anhydride and an aliphatic unsaturated carboxylic ester, or a derivative thereof, and
  c) a rubber-modified styrene-based polymer.

10. The composition according to claim 8, which contains at least one lubricant selected from the group consisting of a fatty acid amide, a paraffin, a hydrocarbon-based resin and a fatty acid in an amount of 0.01 to 5 parts by weight based on 100 parts by weight of the block copolymer hydrogenation product (A).

11. The composition according to claim 8, which contains at least one stabilizer selected from the group consisting of 2-[1-(2-hydroxy-3,5-di-t-pentylpheny)ethyl]-4,6-di-t-pentylphenyl acrylate, 2-t-butyl-6-(3-t-butyl-2-hydroxy-5-methylbenzyl)-4-methyl-phenyl acrylate and 2,4-bis[(octylthio)methyl]-o-cresol in an amount of 0.05 to 3 parts by weight based on 100 parts by weight of the block copolymer hydrogenation product (A).

12. The composition according to claim 8, which contains at least one ultraviolet absorber or light stabilizer selected from the group consisting of a benzophenone-based ultraviolet absorber, a benzotriazole-based ultraviolet absorber and a hindered amine-based light stabilizer in an amount of 0.05 to 3 parts by weight based on 100 parts by weight of the block copolymer hydrogenation product (A).

13. A sheet/film comprising the composition according to claim 8.

14. A heat shrinkable sheet/film obtained by stretching the sheet/film according to claim 13, wherein the degree of heat shrinkage at 80° C. in the stretching direction is from 5 to 70%, and the tensile modulus in the stretching direction is from 7,000 to 30,000 Kg/cm$^2$.

15. A heat shrinkable multilayer film having as at least one layer a layer comprising the composition according to claim 8, wherein the degree of heat shrinkage at 80° C. in a stretching direction is from 5 to 70%.

16. The heat shrinkable multilayer film according to claim 15, which has a tensile modulus in a stretching direction of 7,000 to 30,000 Kg/cm$^2$.

* * * * *